United States Patent [19]

Su

[11] Patent Number: 5,439,239

[45] Date of Patent: Aug. 8, 1995

[54] COLLAPSIBLE LUGGAGE CART

[76] Inventor: Chung-shiu Su, No. 3 Lane 565, Ta She Road, Lu Chu Hsiang, Kaohsiung Hsuan,

[21] Appl. No.: 324,934

[22] Filed: Oct. 18, 1994

[51] Int. Cl.⁶ .................................... B62B 1/12
[52] U.S. Cl. ........................... 280/40; 280/42; 280/655; 280/47.29
[58] Field of Search ............. 280/40, 42, 651, 652, 280/655, 47.24, 47.27, 47.29

[56] References Cited

U.S. PATENT DOCUMENTS

| | | | |
|---|---|---|---|
| 2,729,460 | 1/1956 | Forman | 280/40 |
| 4,448,434 | 5/1984 | Anderson | 280/40 |
| 4,754,985 | 7/1988 | Im et al. | 280/40 |
| 4,917,392 | 4/1990 | Ambaz | 280/40 |
| 5,072,958 | 12/1991 | Yong | 280/40 |
| 5,127,662 | 7/1992 | Spon | 280/40 |
| 5,348,325 | 9/1994 | Abrams | 280/40 |

Primary Examiner—Richard M. Camby
Attorney, Agent, or Firm—Pro-Techtor International

[57] ABSTRACT

A collapsible luggage cart comprising an inverted U-shaped handle combined with a horizontal eccentric tube with pivotal discs, a vertical middle support tube and two vertical side support tubes combined pivotally with and under the eccentric tube with both a middle pivotal ring and two side pivotal rings so as to make the handle swingable upward for spreading and downward for collapsing, a luggage frame combined pivotally with the lower ends of the middle and the two side vertical tubes so as to make the luggage frame swingable down for spreading for use or up for collapsing, and two wheels combined with two wheel frames combined pivotally with the two vertical side support tubes so as to make the wheel frames swingable outward for spreading and inward for collapsing.

3 Claims, 8 Drawing Sheets

COLLAPSIBLE LUGGAGE CART

BACKGROUND OF THE INVENTION

This invention concerns a collapsible luggage cart, particularly one of an improved structure for easy spreading and collapsing and firm stability.

Although various kinds of collapsible luggage carts are known and in use, most of them generally a little complicated in spreading and collapsing.

SUMMARY OF THE INVENTION

The object of this invention is to offer a kind of collapsible luggage cart which can be collapsed from a spread condition or vice versa with easiness and stability.

A collapsible luggage cart in the present invention comprises an inverted U-shaped handle, a horizontal eccentric tube connected pivotally with two ends of the handle, two side vertical support tubes connected with the two ends of the eccentric tube through two pivotal rings to enable the handle swing up and down relative to the two side support tubes in spreading and collapsing The horizontal eccentric tube has an intermediate curved portion connected with two eccentric rings and with a middle pivotal ring between the two eccentric rings. The middle pivotal ring is connected with a vertical middle support tube having a slidable ring fitting around and sliding along the middle support tube. The middle support tube has its lower end connected pivotally with a luggage frame. Two rotatable rods are connected pivotally between the slidable ring and the two eccentric rings so that when the eccentric tube together with the two eccentric rings rotates, the middle support tube moves up and down, forcing the slidable ring slide up and down along the middle tube by dint of the rotatable rods.

The two side vertical support tubes respectively have its intermediate portion fitted around with a rotatable support sleeve, its lower end fitted around with a stop sleeve, and its lower end opening fitted with a short pivotal post, which is connected pivotally in a side opening in a rear side of the luggage frame. The rotatable sleeve has a sidewise cylindrical portion for connecting the upper end of each of two L-shaped wheel frames, and the stop sleeve is connected with the end of the horizontal portion of each wheel frame. Each wheel frame has a rotatable ting fixed on the vertical portion and the rotatable ring is pivotally connected with the slidable ring so that the connecting rod may pushed to move the wheel frame when the slidable ring is moved up and down. Each wheel frame can be swung outward for spreading and inward for collapsing with the rotatable sleeve and the stop sleeve as pivots. As an L-shape stop surface is provided at the rear side of each end opening of the luggage frame to stop a locking block of the stop sleeve and thus secures the wheel frames in place. And a middle opening of the rear side of the luggage frame has a front stop wall to prevent the short bottom tube of the middle support tube from separating therefrom when the luggage frame is swung down for spreading this cart. In addition, the two connecters can engage the upper end of each side support tubes when the handle is spread up, securing the side support tubes in place.

In collapsing this cart from a spread condition, the luggage frame can be swung or folded up with a foot tip, with the stop surfaces disengaging from the stop sleeve, and then the handle is swung or folded down, forcing the eccentric tube rotate to move backward together with the eccentric rings, and pulling up the two rotatable rods, the slidable ring and the two connecting rods together, and consequently the connecting rods pulling the two wheel frames inward. Then the handle is manually swung or folded down on the folded-down luggage frame, and the horizontal connecting rod can be held with a hand for carrying this collapsed cart. Besides, the horizontal connecting rod forces the handle kept in pressing down the folded-down luggage frame by the lever principle, preventing the luggage frame from spreading by accident.

DETAILED DESCRIPTION OF THE INVENTION

Figure 1:
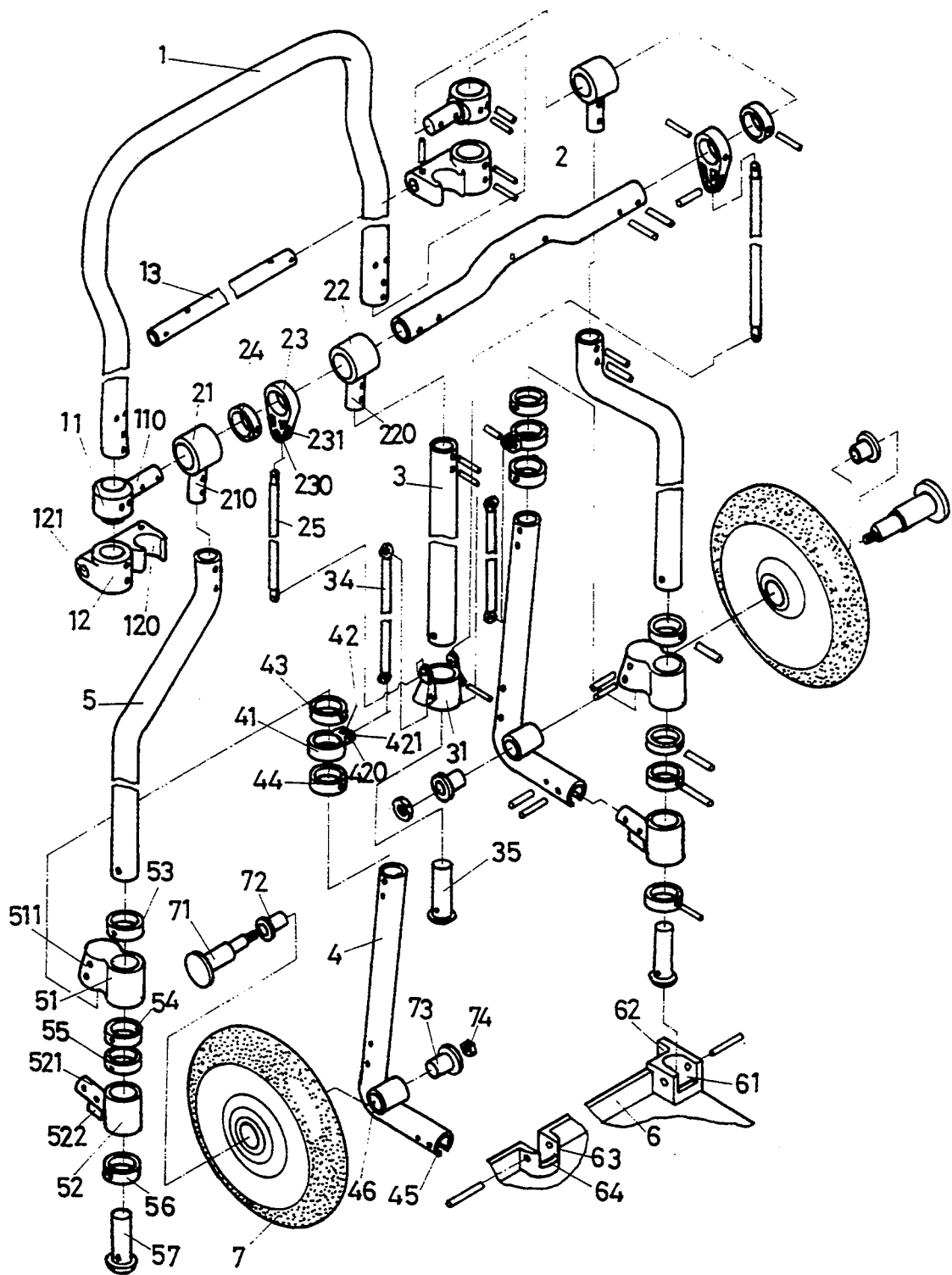
FIG. 1 is an exploded perspective view of a collapsible luggage cart in the present invention.
Figure 2:
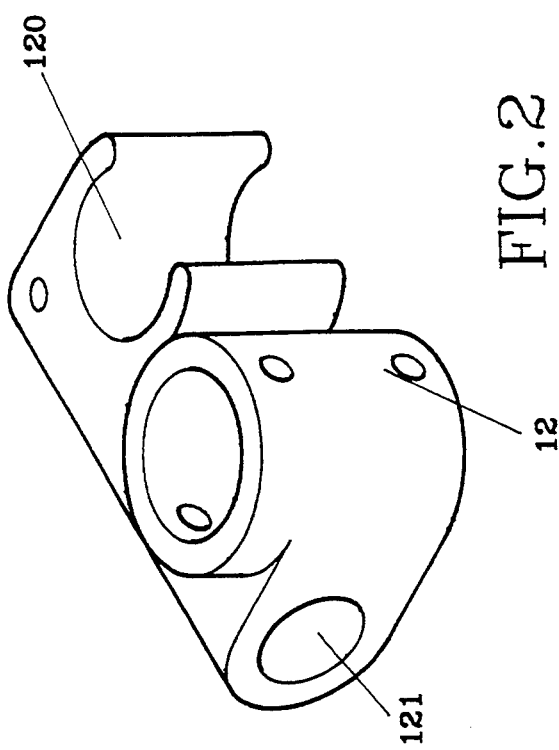
FIG. 2 is a perspective view of a connecter in the collapsible luggage cart in the present invention.
Figure 3:
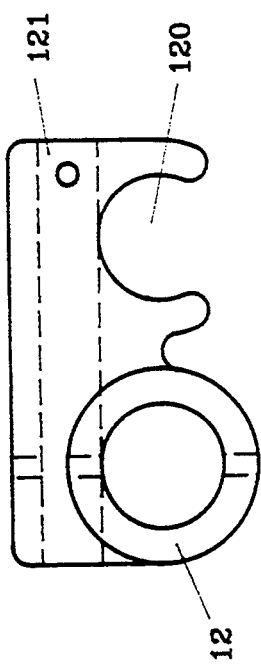
FIG. 3 is an up side view of the connecter in the collapsible luggage cart in the present invention.
Figure 4:
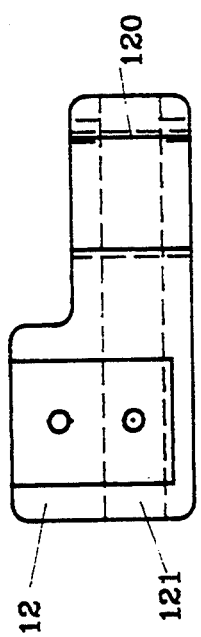
FIG. 4 is a front cross-sectional view of the connector in the collapsible luggage cart in the present invention.
Figure 5:
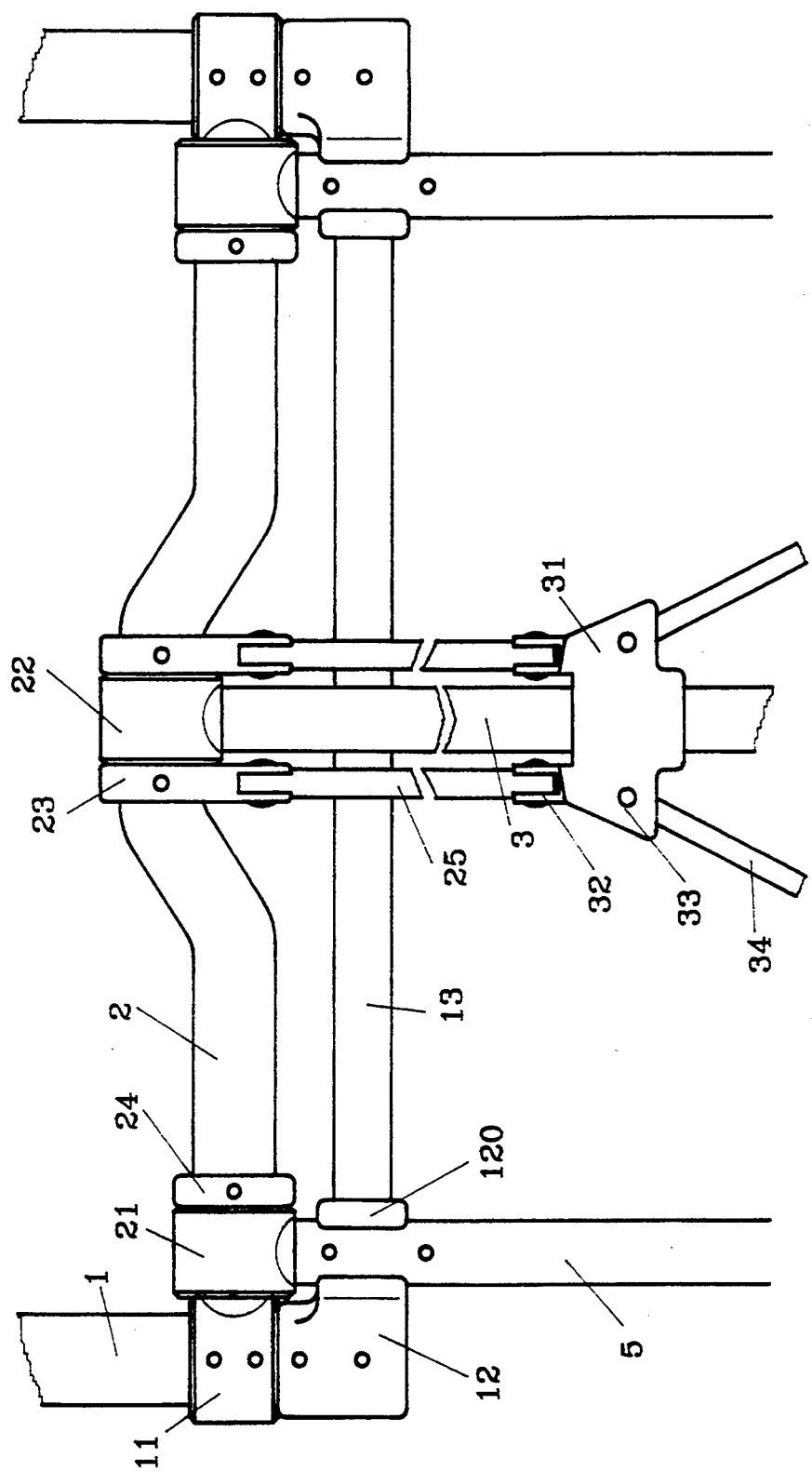
FIG. 5 is a front view of a horizontal eccentric tube and a slidable ring pivotally connected in the collapsible luggage cart in the present invention.
Figure 6:
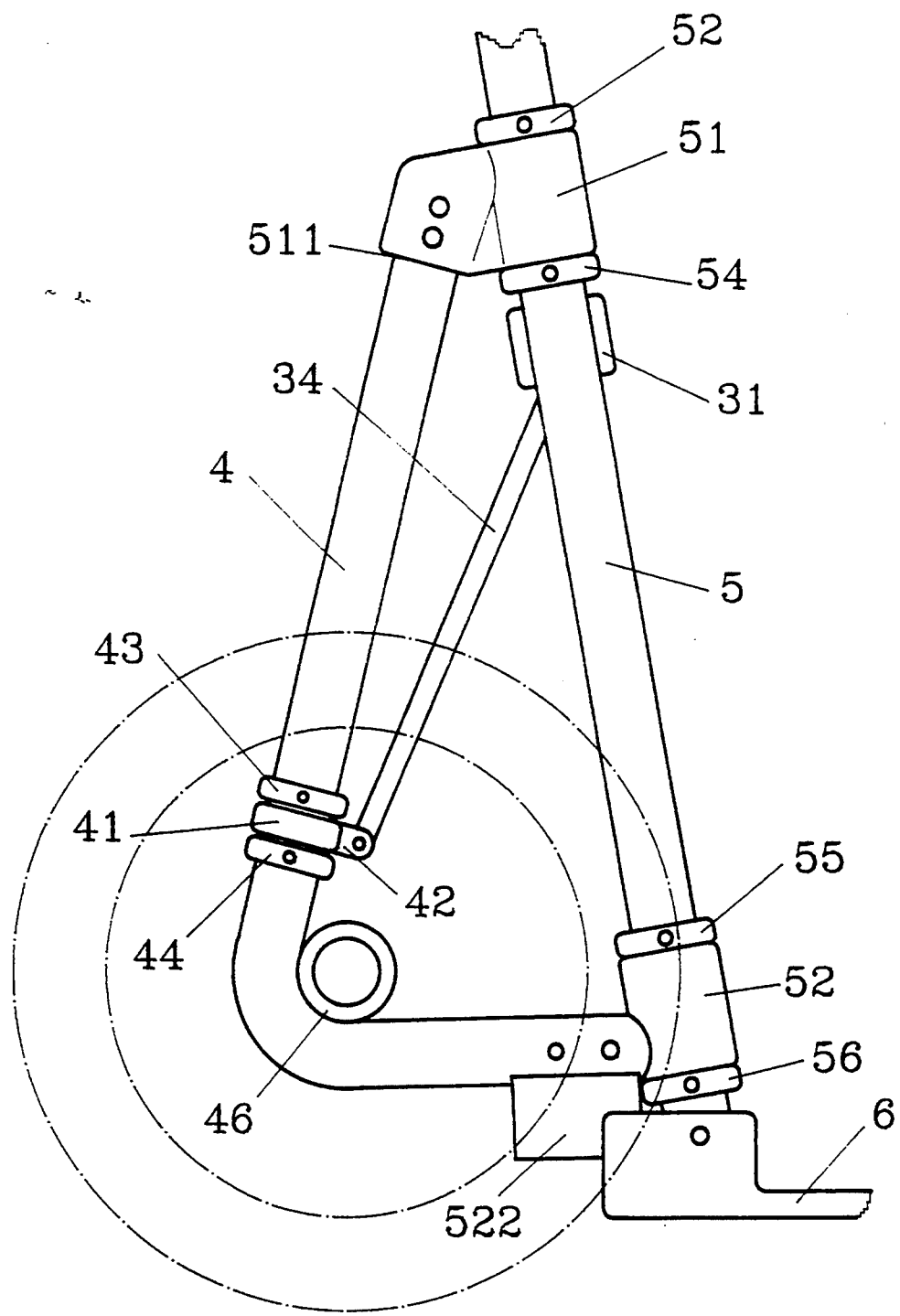
FIG. 6 is a side view of a wheel frame, a side vertical support tubes an a luggage support frame pivotally connected together in the collapsible luggage cart in the present invention.
Figure 7:
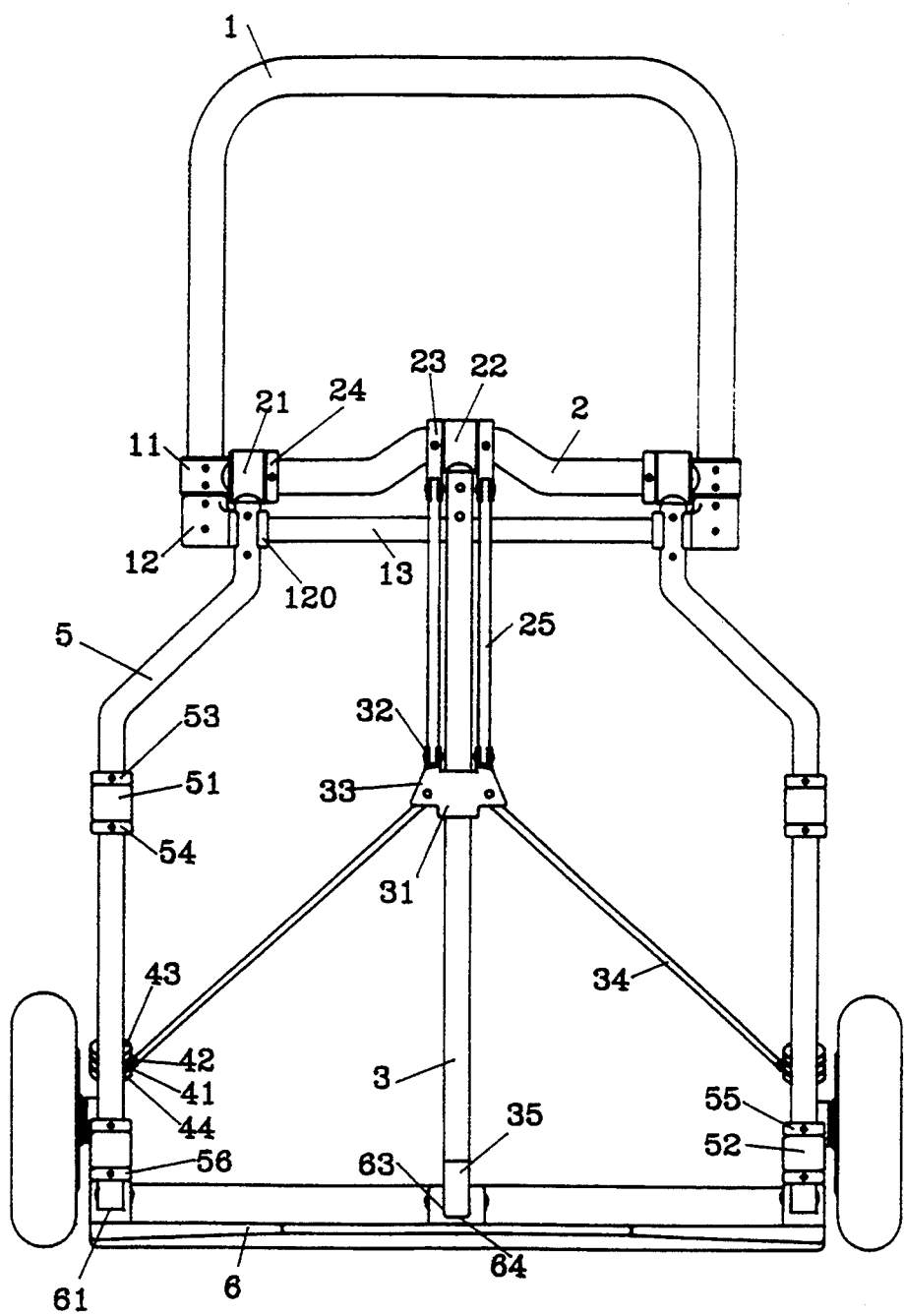
FIG. 7 is a front view of the collapsible luggage cart in the present invention.
Figure 9:
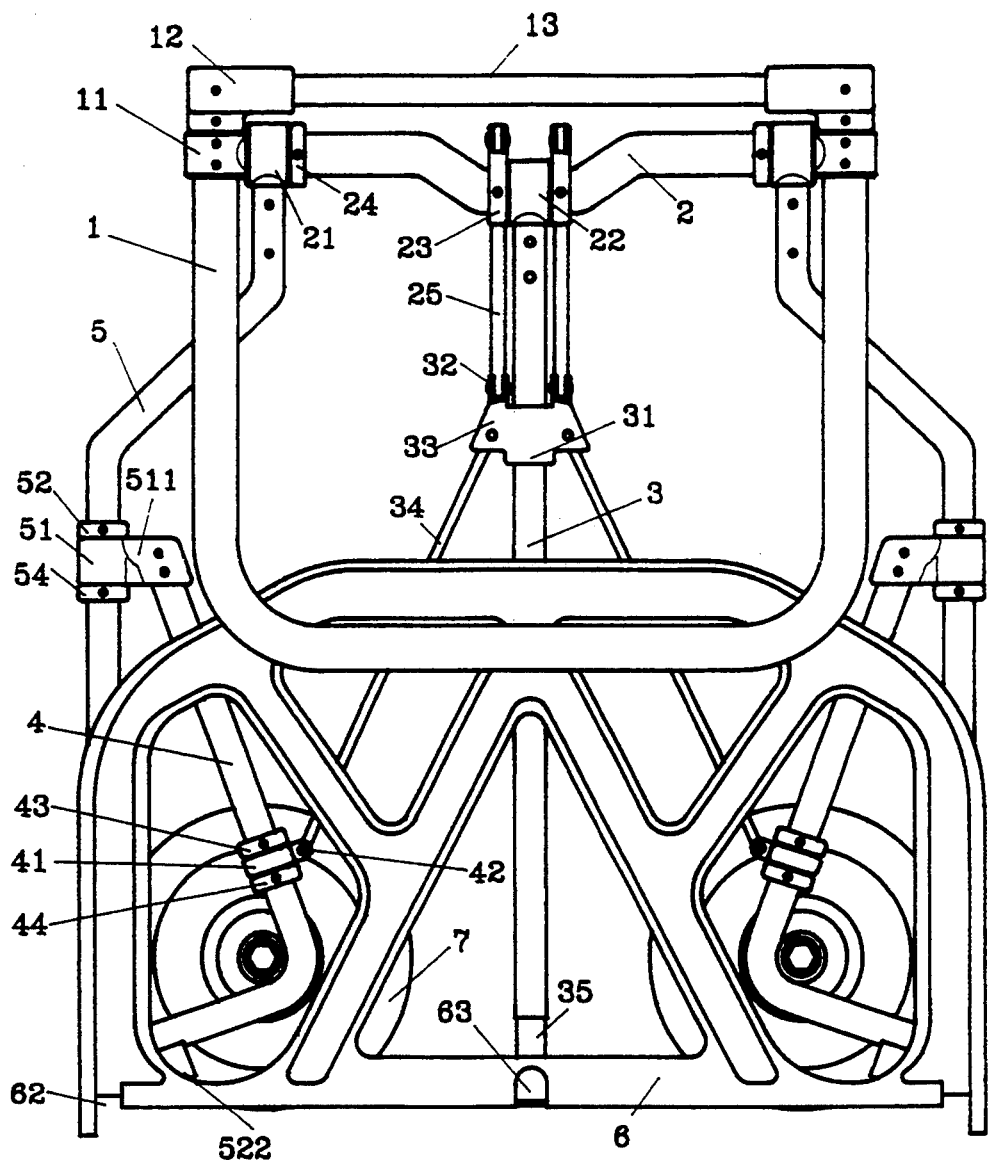
FIG. 9 is a front collapsed view of the collapsible luggage cart in the present invention.
Figure 10:
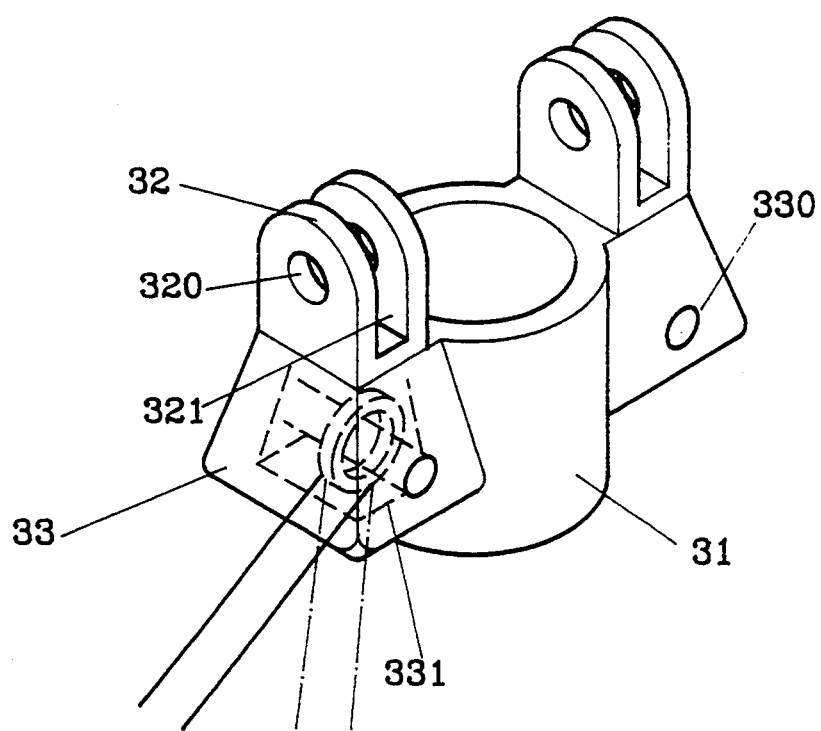
FIG. 10 is a perspective view of the slidable ring in the collapsible luggage cart in the present invention.

A collapsible luggage cart in the present invention as shown in FIGS. 1, 7 and 9, comprises a handle 1, an horizontal eccentric tube 2, a vertical middle support tube 3, two wheel frames 4, two side vertical support tubes 5, 5, a luggage-frame 6 and two wheels 7, 7 as main components combined together.

The handle 1, as shown in FIGS. 1-5, 7 and 8, is shaped as an inverted U, having two ends respectively combined with a pivotal disc 11 provided with a sidewise short tube 110 and a connecter 12 connected under the pivotal disc 11 by means of rivets. The connecter 12 has a C-shaped portion 120 with an opening for the upper end of each of two side vertical support tubes 5, 5 to pass through to fit therein, a horizontal hole 121 provided in the rear portion. A horizontal connecting rod 13 is put between the two horizontal holes 121, 121 of the two connecters 12, 12 and riveted firmly with the connecters 12, 12 for manual holding for carrying this cart when the handle 1 is collapsed or folded down.

The horizontal eccentric tube 2, as shown in FIGS. 1, 5, 7, 8 and 9, has an intermediate curved portion, two ends respectively connected pivotally with a pivotal ring 21 by means of a fixing ring 24 riveted beside the ring 21 with the eccentric tube 2, two eccentric rings 23 fixed around the intermediate curved portion, a middle pivotal ring pivotally fitting around the curved intermediate portion between the two eccentric rings 23, 23. Then the handle 2 can be swung relative to the eccentric tube 2 by means of the three pivotal rings 21, 21 and 22 for spreading and collapsing. The pivotal rings 21, 21 respectively have a vertical short tube portion 210 fitting and riveted firmly in the upper end opening of each of the two side support tubes 5, 5. The middle pivotal ring 22 also has a vertical short tube portion 220 fitting and riveted firmly in the upper end opening of the middle support tube 3. The two eccentric rings 23, 23 respectively have an eccentric hole 230, a groove 231 intersecting with the hole 230. Two rotatable rods 25, 25 respectively have an upper end fitting in the groove 231 of each eccentric ring 23 and pivotally combined with the ring 23 with a rivet, and a lower end pivotally combined with a slidable base 31.

The vertical middle support tube 3, as shown in FIGS. 1, 5, 7, 8, 9 and 10, has its upper end fitting and riveted around the vertical tube portion 220 of the middle pivotal ring 22, and its lower end connected firmly with a short bottom tube 35. The lower end of the short bottom tube 35 fits in an end opening 63 of the luggage frame 6 and pivotally connected with the frame 6 with rivets. A slidable ring 31 is provided to fit around and slide along the middle support tube 3, having two pairs of upper opposite projecting ears 32, 32 and two lower opposite projecting ears 33, 33. The two pairs of the upper ears 32, 32 respectively have a middle opening 321 and a hole 320, with the middle opening 321 for fitting the lower end of the rotatable rod 25, and then a rivet is put through the holes 320, 320 and the rod 25 for connecting pivotally the rotatable rod 25 with the slidable ring 31. The two lower projecting ears 33, 33 respectively have a bore 331 and a through hole 330 intersecting the bore 331, and the bore 331 is for fitting therein an upper end of each of the two connecting rods 34, 34 and then a rivet is through each hole 330 and each rod 34 for pivotally connecting each connecting rod 34 with the slidable ring 31. And the lower end of each of the two connecting rods 34, 34 is pivotally connected with a rotatable ring 41 of each wheel frame 4.

The two wheel frames 4, 4, as shown in FIGS. 1, 6, 7 and 9, are L-shaped, and respectively having its upper end combined with a support sleeve 51 of each vertical side support tube 5, its lower end combined with a stop sleeve 52, a rotatable ring 41 fitting around the vertical portion, two fixing rings 43 and 44 fitted and riveted around the same vertical portion at both sides of the rotatable ring 41 to let the ring 41 rotate at the position. The rotatable ring 41 has a pair of projecting ears 42 defining an intermediate opening 421 and bored with a hole 420. The opening 421 is for the lower end of connecting rod 34 to fit therein and a rivet passes through the holes 420, 42 of the ears 42, 42 to pivotally connect the rod 34 with the ring 41. A bearing supporter 46 is provide at the bending corner-of each wheel frame 4 for combining a wheel 7 with the wheel frame 4. Each wheel frame 4 has also a downward slot 45 in the lower en for a locking block 522 of a stops sleeve 52 to fit therein when a sidewise tube 521 of the stop sleeve 52 is inserted in the end opening of the frame 4. The the sidewise tube 521 is fixed firmly with the frame by means of rivets. The upper end of each frame 4 is fitted and fixed in the cylindrical portion 511 of the support sleeve 51 by means of rivets.

The two vertical side support tubes 5, 5, as shown in FIGS. 1, 6, 7 and 9, are n early shaped as N, respectively having its upper end fitted and fixed with rivets around the vertical tube portion 210 of each side pivotal ring 21, its intermediate portion fitted around with the support sleeve 51, which is kept rotatable at its position by two fixing rings 53, 54 deposited on and under the support sleeve 51 by means of rivets. The support sleeve 51 has a sidewise cylindrical portion 511 for the upper end of each wheel frame 4 to fit and be riveted therein. The lower end of each side support tube 5 fits through the stop sleeve 52 which is kept at its position with two fixing rings 55, 56 by means of rivets to let the stop sleeve 52 rotate. The stop sleeve 52 has a sidewise short tube 521 and a locking block 522 extending down from the tube 521, with the locking block 522 fitting in the slot 45 in the lower end of each wheel frame 4 and with the sidewise tube 52 1 fitting and fixed with the lower end opening of each wheel frame 4 with rivets. Then a short pivotal post 57 is provided to fit and fixed in the lower end opening of each side support tube 5, and riveted in a side opening 61 of the luggage frame 6.

The luggage frame 6 has an end opening 61 respectively at both ends of a rear side for the lower end of each side support rod 5 together with the short post 57 to fit and be fixed therin with a rivet, an L-shape stop surface 62 provided behind each end opening 61 to stop the locking block 522 of the stop sleeve 52, a middle opening 63 between the two end openings 61, 61 for the lo wet end of the short bottom tube 35 of the middle sup port tube 3 to fit and be fixed therein, enabling the luggage frame 6 rotate with the short bottom tube 35 together. The middle opening 63 is defined by front stop wall 64 for stopping the short bottom tube 35 in moving.

The two wheels 7, 7 are respectively supported by a shaft 71 combined with a bearing 72 fitted in a bearing supporter 46 by means of a bearing seal 73, and the bearing supporter 46 is welded on a bending corner of each L-shaped wheel frame 4.

Figure 8:
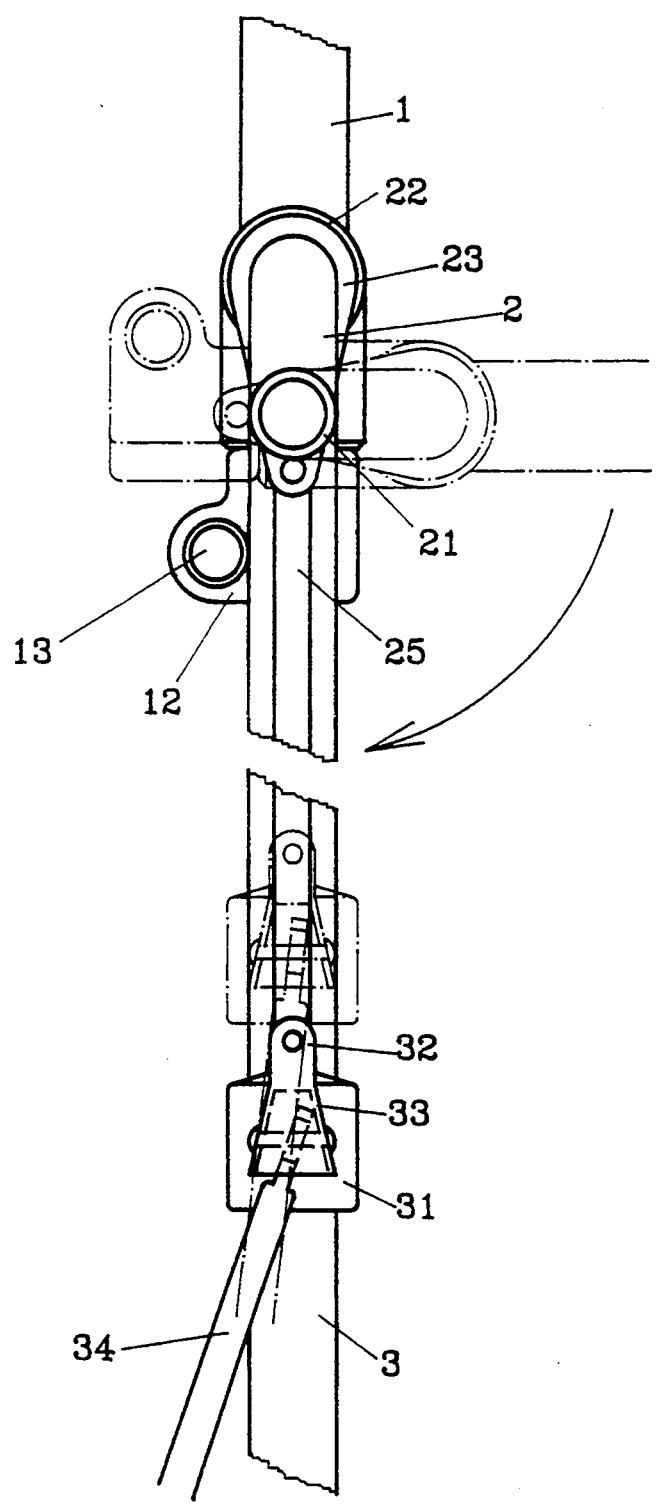
FIG. 8 is a front view of an eccentric ring and a slidable ring of the collapsible luggage cart in the present invention, showing how the parts are operated.

In combining, referring to FIGS. 7, 8 and 9, the handle 1 is combined with the eccentric tube 2 by means of two pivotal discs 11, 11, with the two ends of the eccentric tube 2 combined with the upper ends of the two vertical side support tubes 5, 5 by means of the two side pivotal rings 21, 21. The intermediate portion of the eccentric tube 2 is combined with the middle support tube 3 by means of the middle pivotal ring 22, and combined with the upper ends of the two rotatable rods 25 by means of the two eccentric rings 23, 23. The lower ends of the two rotatable rods 25, 25 are combined with the two pairs of upper ears 32, 32 of the slidable ring 31 fitting around the middle support tube 3 so that when the handle is swung up and down, the eccentric tube 2 may force the middle support tube 3 and the short bottom tube 35 move up and down, with the eccentric tube 2 together with the two eccentric rings 23, 23 rotating, with the two rotating rods 25, 25 pulling an d pushing the slidable ring 31 to move up and down. As the two lower ears 33, 33 of the slidable ring 31 are pivotally connected with the two connecting rods 34, 34, which are also pivotally connected with the rotatable rings 41, 41 which are connected also pivotally with the wheel frames 4, 4, the rotatable rings 41, 41 are rotated by the two connecting rods 34, 34. Then the wheel frames 4, 4 are swung inward for collapsing or outward for spreading with both the support sleeves 51, 51 and the stops sleeves 52, 52 as pivots.

After the two wheel frames 4, 4 are spread outward, the locking blocks 522, 522 of the stop sleeves 52, 52 are stopped and kept at that position by the stopping surfaces 62,62 behind the side opening 61 of the luggage frame 6, and the stop wall 64 of the middle opening 63 stopping the lower end of the short bottom tube 35 of the middle support tube 3 to secure the two wheel frames 4, 4 in position. And the upper ends of two side support tubes 5, 5 are made to engage with the C-chaped portions 120, 120 of the connecters 12, 12, preventing the handle 1 from collapsing and securing this luggage cart kept in spread condition for use. The horizontal connecting rod 13 connected between the two connecters 12, 12 can be held manually for carrying the collapsed luggage cart, preventing the luggage frame 6 from spreading accidentally because of the lever principle after the luggage frame 6 is folded upward and the handle 1 is folded down on the luggage frame 6, in a collapsed condition.

What is claimed is:

1. A collapsible luggage cart comprising;

a handle shaped as an inverted U, made of a tube, and having two ends respectively combined with a pivotal disc provided with a sidewise short tube, which fits and fixed firmly with rivets in an end opening of a horizontal eccentric tube described later, said pivotal disc being connected with a connecter at the bottom side;

a horizontal eccentric tube having an intermediate curved portion and two side in-line portions, two ends respectively being fitted around with a side pivotal ring provided with a vertical short downward tube which fits in an upper end opening of each of two vertical side support tubes, two eccentric rings fitting around the intermediate portion at both sides of a middle pivotal ring fitting around the same intermediate portion, said middle pivotal ring having a vertical short downward tube fitting in an upper end opening of a vertical middle support tube, each said eccentric ring having an eccentric hole for pivotally connecting an upper end of a rotatable rod, each said rotatable rod having its lower end pivotally connected with a slidable ring of a vertical middle tube;

a vertical middle support tube having its upper end firmly connected with said vertical tube of said middle pivotal ring fitting around the intermediate curved portion of said horizontal eccentric tube, its lower end connected with a short bottom tube fitted and pivotally connected in a middle opening of a horizontal luggage frame, a slidable ring fitted around and able to slide along the vertical middle support tube and having two pairs of tipper ears and two lower ears said two pairs of upper ears pivotally connected with two lower ends of said two rotatable rods, said two lower ears pivotally connected with two upper ends of two connecting rods, the lower ends of which are pivotally connected with a rotatable ring of a wheel frame;

two wheel frames respectively having an L shape consisting of a vertical portion and a horizontal portion, their upper ends respectively fitting in a cylindrical portion of a support sleeve of a vertical side support tube, their lower ends respectively fitting in a stop sleeve of the vertical side support tube, a rotatable ring provided to fit around the lower portion of each said wheel frame and having a pair of projecting sidewise ears pivotally connected the lower end of said two connecting rods, a downward slot provided in each said lower end which has an end opening for a sidewise short tube of said stop sleeve to fit therein, said downward slot being fitted through by a locking block extending down from the sidewise short tube of said stop sleeve;

two vertical side support tubes are nearly shaped as an N, respectively having their upper end connected with each said side pivotal ring fitting around each end of said eccentric tube, their lower ends fitting and riveted in two side openings of a luggage frame, their intermediate portion fitted around with a rotatable support sleeve kept at its position by two fixing rings riveted around said intermediate portion on and under said rotatable support sleeve, which has a sidewise cylindrical portion for the upper end of each said wheel frame to fit therein, a rotatable stop sleeve provided to fit around the lower end and having a sidewise short tube to fit in the lower end opening of each said wheel frame, two pivotal short posts provided to fit in the lower end openings and pivotally deposited in two side openings of a horizontal luggage frame;

a horizontal luggage frame having two side openings at both ends of a rear side for the bottom end of each said vertical side support tube to fit and be riveted pivotally therein, a middle opening between said two side openings for said short bottom tube of said middle support tube to fit and riveted pivotally therein; and said handle able to be folded down to a collapsed condition from a spread condition or vice versa with said two pivotal discs as pivots, with said eccentric tube swung down or up by means of said two eccentric rings with said slidable ring moving up and down along said middle support tube, said two connecting rods pulled or pushed by said slidable ring pulling or pushing said two rotatable rings on said two wheel frames and consequently forcing said two wheel frames being spread outward or collapsed inward with said rotatable support sleeves and said rotatable stop sleeves as pivots.

2. The collapsible luggage cart as claimed in claim 1, wherein said two connecters, placed under said two pivotal discs connected with the lower ends of said handle, respectively has a C-shaped portion for fitting firmly the upper end of each said side vertical support tube after said handle is swung up for spreading from a collapsed position wherein said handle is swung down to rest on said luggage frame swung up to rest on said middle support tube and said two vertical side support tubes, preventing said handle from swung down, said two connecters also having a horizontal hole in a rear portion for combining a horizontal connecting rod between themselves, said connecting rod being held manually for carrying said cart after it is collapsed and for preventing said luggage frame from swinging down and spreading by accident.

3. The collapsible luggage cart as claimed in claim 1, wherein said two end openings of said luggage frame respectively have an L-shaped stop surface behind themselves for stopping said locking block of each said stop sleeve of each said vertical side support tube after said two wheel frames are spread out, securing said wheel frames in position, and said middle opening of said luggage frame has a front stop wall for preventing said short bottom tube of said vertical middle tube from separating from said middle opening after said luggage frame is swung down for spreading.

* * * * *